(12) United States Patent
Endoh

(10) Patent No.: US 8,526,076 B2
(45) Date of Patent: Sep. 3, 2013

(54) ILLUMINATION APPARATUS, IMAGE READING APPARATUS, AND IMAGE FORMING APPARATUS

(75) Inventor: Sasuke Endoh, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 286 days.

(21) Appl. No.: 13/045,431

(22) Filed: Mar. 10, 2011

(65) Prior Publication Data

US 2011/0235136 A1 Sep. 29, 2011

Related U.S. Application Data

(60) Provisional application No. 61/318,237, filed on Mar. 26, 2010.

(51) Int. Cl.
| | | |
|---|---|---|
| H04N 1/04 | (2006.01) | |
| G01J 1/32 | (2006.01) | |
| A61B 1/04 | (2006.01) | |
| F21V 7/00 | (2006.01) | |
| F21V 7/04 | (2006.01) | |

(52) U.S. Cl.
USPC ............. 358/475; 358/483; 358/474; 358/84; 358/478; 250/205; 348/68; 362/308; 362/615

(58) Field of Classification Search
USPC ................. 358/484, 475, 483, 482, 474, 497; 362/551
See application file for complete search history.

(56) References Cited

U.S. PATENT DOCUMENTS

| | | | | |
|---|---|---|---|---|
| 7,538,911 | B2* | 5/2009 | Sakurai et al. | 358/475 |
| 2005/0135840 | A1 | 6/2005 | Sakurai | |
| 2006/0098247 | A1* | 5/2006 | Sawada | 358/478 |
| 2007/0013971 | A1* | 1/2007 | Spears | 358/474 |
| 2009/0027915 | A1 | 1/2009 | Kaneko | |
| 2010/0046234 | A1* | 2/2010 | Abu-Ageel | 362/308 |
| 2010/0265551 | A1 | 10/2010 | Endoh | |

FOREIGN PATENT DOCUMENTS

JP  08-163320 A  6/1996

\* cited by examiner

*Primary Examiner* — Charlotte M Baker
*Assistant Examiner* — Rury Grisham
(74) *Attorney, Agent, or Firm* — Patterson & Sheridan, L.L.P.

(57) ABSTRACT

An illumination apparatus includes a light source that generates light used for reading an image and a light guide body which extends in a predetermined direction and onto which the light from the light source is incident. The light guide body includes a pair of first faces that reflect the light so as to cause the light to direct to an image reading region from directions different from one another, a second face which emits the light directing from the first faces toward the image reading region and onto which the light reflected from the image reading region is incident, and a third face which emits the light that is incident from the second face and passes between the pair of first faces.

10 Claims, 6 Drawing Sheets

ILLUMINATION APPARATUS, IMAGE READING APPARATUS, AND IMAGE FORMING APPARATUS

CROSS-REFERENCE TO RELATED APPLICATION

This application is based upon and claims the benefit of priority from: U.S. provisional application 61/318237, filed on Mar. 26, 2010, the entire contents of which are incorporated herein by reference.

FIELD

Embodiments described herein relate generally to an illumination apparatus, an image reading apparatus, and an image forming apparatus.

BACKGROUND

In an image reading apparatus used in digital copiers, in order to read an image for one line extending in a main scanning direction, a light source illuminates an original document with light in a line form extending in the main scanning direction and the light reflected from the original document is collected by a lens so as to be incident onto an image sensor.

When an image reading region of the original document is illuminated by illumination light from only one direction, there is a concern that illumination irregularity of the illumination light may occur.

DETAILED DESCRIPTION

According to an embodiment, an illumination apparatus includes a light source that generates light used for reading an image and a light guide body which extends in a predetermined direction and onto which the light from the light source is incident. The light guide body includes a pair of first faces that reflect the light so as to cause the light to direct to an image reading region from directions different from one another, a second face which emits the light directed from the first faces toward the image reading region and onto which the light reflected from the image reading region is incident, and a third face which emits the light that is incident from the second face and passes between the pair of first faces.

First Embodiment

Figure 1:
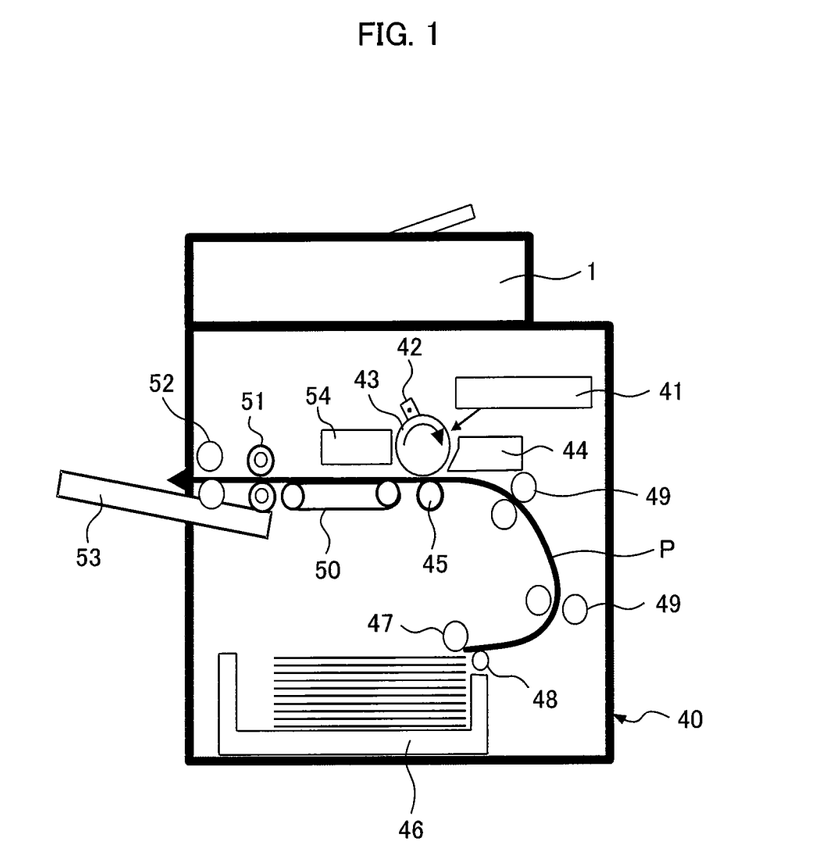
FIG. 1 is a diagram illustrating the configuration of an image forming apparatus.

An image forming apparatus (Multi-Functional Peripheral (MFP)) according to this embodiment will be described with reference to FIG. 1. FIG. 1 is a schematic diagram illustrating the internal configuration of an image forming apparatus 40.

The image forming apparatus 40 has a paper feed cassette 46, and the paper feed cassette 46 stores a plurality of sheets. A paper feed roller 47 and a separation roller 48 separate the plurality of sheets stored in the paper feed cassette 46 sheet by sheet so as to be supplied to a sheet carriage path P. The sheet carriage path P has a plurality of carrying rollers 49. The sheet passes through the sheet carriage path P, and an image is formed on the sheet.

A charging apparatus 42 charges a surface of a photoconductive drum 43. The photoconductive drum 43 is rotated in a direction indicated by an arrow. An optical scanning apparatus 41 illuminates a laser beam on a photoconductive surface of the photoconductive drum 43 such that an electrostatic latent image corresponding to image data is formed on the photoconductive surface. The image data, for example, includes image data transmitted to the image forming apparatus 40 from an external device (for example, Personal Computer) and image data generated by a reading operation of an image reading apparatus 1.

A developing apparatus 44 supplies toner to the surface of the photoconductive drum 43 so as to form a toner image. A transfer apparatus 45 transfers the toner image formed on the surface of the photoconductive drum 43 onto the sheet. A cleaning apparatus 54 removes the toner remaining on the surface of the photoconductive drum 43.

In this embodiment, the toner image formed on the photoconductive drum 43 is transferred onto the sheet. However, the toner image formed on the photoconductive drum 43 may be transferred on an intermediate transfer belt and is then transferred from the intermediate transfer belt onto the sheet.

A carrying apparatus 50 carries the sheet on which the toner image is transferred to a fixing apparatus 51. The fixing apparatus 51 heats the sheet so as to fix the toner image onto the sheet. A paper discharge roller 52 moves the sheet from the fixing apparatus 51 to a tray 53. The sheet discharged from the paper discharge roller 52 is loaded on the tray 53.

The image reading apparatus 1 generates image data by scanning an image of a sheet original document or a book original document. In this embodiment, the image reading apparatus 1 is provided in the image forming apparatus 40 as a digital multi-functional peripheral. Even when the image reading apparatus 1 is provided in an image forming apparatus as a digital copier or a product is configured by only the image reading apparatus 1, this embodiment can be applied.

Figure 2:
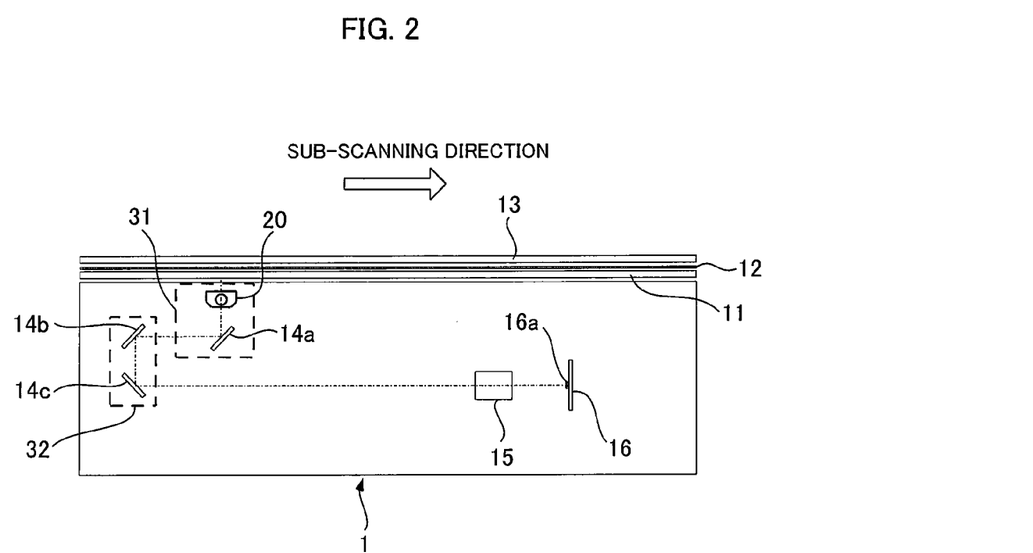
FIG. 2 is a cross-sectional view of an image reading apparatus according to a first embodiment.

Next, the configuration of the image reading apparatus 1 will be described with reference to FIG. 2. FIG. 2 is a cross-sectional view of the image reading apparatus 1 along a sub-scanning direction.

On an upper surface of a platen glass 11, an original document 12 is placed, and a reading surface of the original document 12 faces the upper surface of the platen glass 11. A platen cover 13 is able to rotate relative to a main body of the image reading apparatus 1 and thus is moved between a position where the upper surface of the platen glass 11 is opened and a position where the upper surface of the platen glass 11 is closed. As the platen cover 13 is moved to the closed position, the original document 12 is pressed against the platen glass 11. The platen cover 13 may be provided in an ADF.

An illumination apparatus 20 illuminates the original document 12 with illumination light. The illumination apparatus 20 extends in a direction perpendicular to a paper surface (main scanning direction) of FIG. 2, and the line-shaped illumination light is illuminated from the illumination apparatus 20 in the longitudinal direction of the illumination apparatus 20. In the original document 12, one line of an image region extending in the main scanning direction is illuminated with the line-shaped illumination light.

The illumination light of the illumination apparatus 20 is reflected on the original document 12, and the light reflected from the original document 12 is reflected by turn-back mirrors 14a, 14b, and 14c so as to direct to an imaging lens 15. The imaging lens 15 collects the light from the turn-back mirror 14c so as to be imaged on an image sensor 16. The image sensor 16 has a plurality of light-receiving elements 16a arranged in the direction perpendicular to the paper surface of FIG. 2. The plurality of light-receiving elements 16a are disposed to correspond to the line-shaped illumination light so as to collect the line-shaped illumination light. Each of the light-receiving elements 16a outputs an electric signal corresponding to an amount of incident light by performing photoelectric conversion. As the image sensor 16, for example, a CCD sensor may be used.

As the light reflected from the original document 12 is incident onto the plurality of light-receiving elements 16a, one line of the image region on the original document 12 extending in the main scanning direction can be read.

A first carriage 31 supports the illumination apparatus 20 and the turn-back mirror 14a and moves in the sub-scanning direction. A second carriage 32 supports the turn-back mirrors 14b and 14c and moves in the sub-scanning direction.

The first and second carriages 31 and 32 move relative to each other in the sub-scanning direction so as to maintain an optical path length from a surface of the original document (a reflective surface of the illumination light) to an imaging surface of the image sensor 16 to be constant.

For example, speeds of the first and second carriages 31 and 32 moving in the sub-scanning direction may be set to a speed ratio of "2:1 (=the first carriage: the second carriage)". In addition, the first and second carriages 31 and 32 are moved in the sub-scanning direction in synchronization with a timing for the image sensor 16 to read the image (a signal for controlling an output of the image sensor 16).

As the first and second carriages 31 and 32 are moved, the illumination light can be illuminated from the illumination apparatus 20 in the sub-scanning direction. While the first and second carriages 31 and 32 are moved in the sub-scanning direction, lines of the image region in the original document 12 extending in the main scanning direction are sequentially read line by line. As the lines of the image region are sequentially read line by line, the entire surface of the original document 12 can be read.

Figure 3:
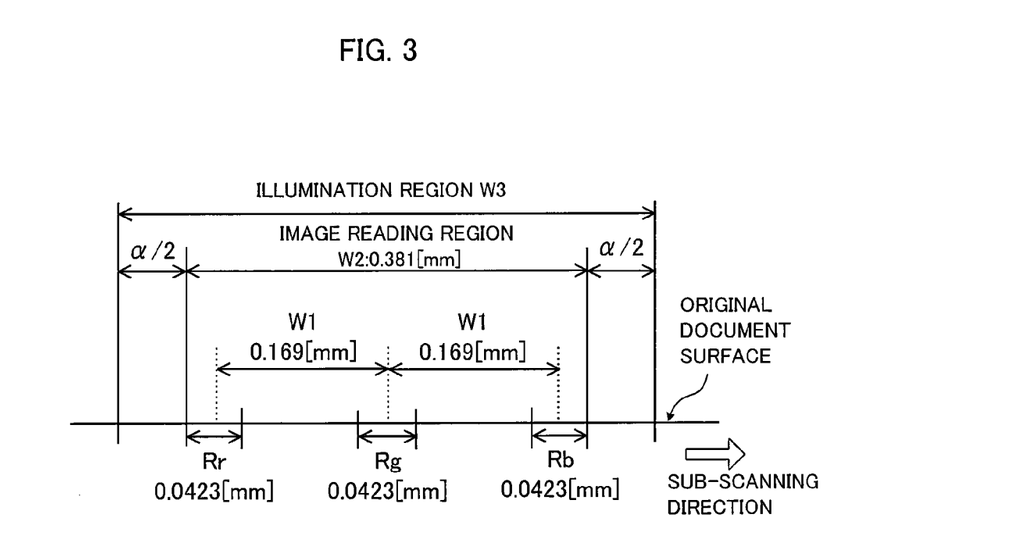
FIG. 3 is a diagram showing a relationship between an image reading region and an illumination region.

Next, a relationship between a reading region of the image and an illumination region of the illumination light will be described with reference to FIG. 3. FIG. 3 shows an image reading region of the original document 12 in the sub-scanning direction.

In FIG. 3, as the image sensor 16, CCD image sensors for each of colors R, G, and B are used, a resolution is set to 600 dpi, and an interval between the adjacent CCD image sensors (length in the sub-scanning direction) is set to an interval corresponding to four lines. Widths of image reading regions Rr, Rg, and Rb for the colors (lengths in the sub-scanning direction) are 0.0423 mm, and each interval W1 between the adjacent image reading regions (length in the sub-scanning direction) is 0.169 mm. The interval W1 is obtained with respect to the centers of the image reading regions Rr, Rg, and Rb. A width of an image reading region W2 corresponding to one line extending in the main scanning direction (length in the sub-scanning direction) is 0.381 mm.

In consideration of misalignment of the illumination regions caused by errors during manufacturing of the image reading apparatus 1, vibrations of the carriages 31 and 32, and the like, in order to stably illuminate the image reading region, it is preferable that an illumination region W3 be wider than the image reading region W2. It is preferable that the width of the illumination region W3 be set so that the image reading region W2 is always positioned in the range of the illumination region W3.

In FIG. 3, both ends of the illumination region W3 are each provided with α/2 with respect to both ends of the image reading region W2. A difference a between the widths of the illumination region W3 and the image reading region W2 may be suitably set.

FIG. 3 shows an example of the configuration of the image sensor 16 and other configurations may also be employed. For example, when the number of lines of the image sensor or the interval between the adjacent image sensors is changed, in consideration of the configuration applying the changes, the image reading region W2 or the illumination region W3 may be set.

Figure 4:
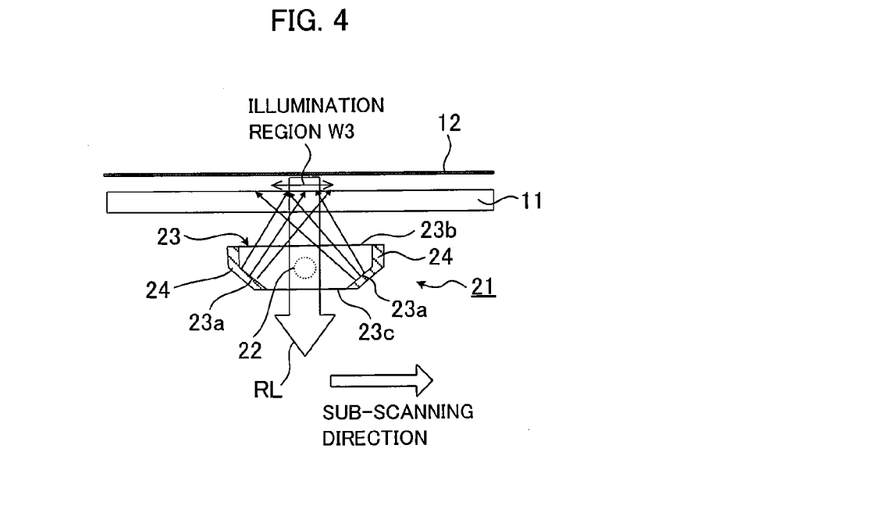
FIG. 4 is a cross-sectional view of an illumination apparatus according to the first embodiment.

Next, the structure of the illumination apparatus 20 will be described with reference to FIGS. 4 and 5. FIG. 4 is a cross-sectional view of the illumination apparatus 20 taken along a surface perpendicular to the longitudinal direction, and FIG. 5 is a top view of the illumination apparatus 20 as viewed from a side of the platen glass 11.

Figure 5:
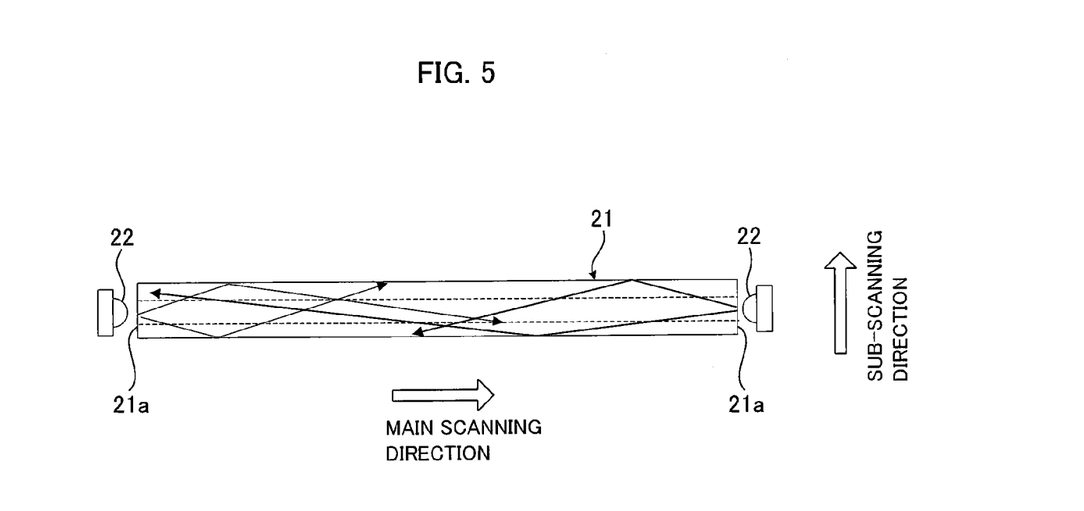
FIG. 5 is a top view of the illumination apparatus according to the first embodiment.

As illustrated in FIG. 5, the illumination apparatus 20 has a light guide body 21 extending in the main scanning direction, and light sources 22 fixed to both ends of the light guide body 21. As the light sources 22, for example, light-emitting diodes (LEDs) may be used, and one or a plurality of the light-emitting diodes may be provided.

The length of the light guide body 21 in the main scanning direction is set to a length corresponding to the length of the original document 12 in the main scanning direction.

In this embodiment, the two light sources 22 are disposed at the both ends of the light guide body 21. However, the light source 22 may also be disposed at only one end of the light guide body 21.

The illumination light illuminated from the light source 22 is incident onto the inside of the light guide body 21 from an end portion 21a of the light guide body 21 and travels along the longitudinal direction of the light guide body 21. Specifically, the light incident onto the light guide body 21 travels along the longitudinal direction of the light guide body 21 while reflecting inside the light guide body 21.

The light guide body 21 has a light guide prism 23 and a case 24 that covers a part of the light guide prism 23. The light guide prism 23 is formed of a resin having a high light transmittance such as acryl or polycarbonate or optical glass.

The light guide prism 23 has first faces (reflecting faces) 23a configured as a plane, a second face (emitting face and incident face) 23b, and a third face (emitting face) 23c, and the first to third faces 23a to 23c extend along the longitudinal direction of the light guide body 21. The length of the second face 23b in the sub-scanning direction is greater than the length of the illumination region W3 in the sub-scanning direction.

As illustrated in FIG. 4, the case 24 covers a region of the light guide prism 23 excluding the second and third faces 23b and 23c. The light incident onto the light guide prism 23 from the light source 22 passes through only the second and third faces 23b and 23c so as to be emitted from the light guide prism 23.

The case 24 may be configured as a metallic plate having a high reflectance, and as the metallic plate, for example, an aluminum plate or a stainless plate may be used. The case 24 may be formed of a white resin or an inner wall surface of the case 24 (a surface being in contact with the light guide prism) may be applied with a reflective paint or the like.

The case 24 may reflect the light incident onto the light guide prism 23. When the inside of the light guide prism 23 enables the illumination light from the light source 22 to undergo total internal reflection, the case 24 may be omitted. The case 24 may cover a part of the second face 23b or the third face 23c. The second face 23b or the third face 23c are faces through which light passes, and a region deviated from a region where the light passes through (optical path) may be covered by the case 24. When the region covered by the case 24 is increased, a light component reflected by the case 24 can be increased.

The light illuminated from the light source 22 is incident from the end portion 21a of the light guide body 21 and travels in the longitudinal direction of the light guide body 21 while reflecting inside the light guide body 21. The light traveling inside the light guide body 21 is emitted to the outside of the light guide body 21 from the second face 23b of the light guide prism 23. As the light undergoes total internal reflection while traveling inside the light guide body 21, the light from the light source 22 can be emitted from the second surface 23b with high efficiency.

The second face 23b faces the platen glass 11. The light emitted from the second face 23b reaches the platen glass 11. The light guide prism 23 has the first faces 23a inclined with respect to the sub-scanning direction, and the light reflecting or diffusing from the first face 23a passes through the second face 23b and reaches the platen glass 11. The light guide prism 23 has a pair of the first faces 23a such that illumination light reaches the platen glass 11 from directions different from one another.

The first face 23a extends in the longitudinal direction of the light guide body 21 and is configured on the plane. The first face 23a may be configured as a convex curved face toward the cover 24. The shape of the first face 23a may be suitably set on the basis of a relationship between reflection characteristics of the first face 23a and the illumination region W3. The first face 23a may be provided with a plurality of concave-convex surfaces. By forming the concave-convex surfaces on the first face 23a, light reflecting efficiency of the first face 23a can be enhanced.

The second face 23b may be provided with positive or negative optical power (an inverse of a focal length). Specifically, in consideration of the illumination region W3, the second face 23b may be provided with optical power.

A reflected light RL from the original document 12 is incident onto the inside of the light guide prism 23 from the second face 23b. The reflected light RL travels in the direction perpendicular to a surface of the platen glass 11 (the original document 12). The second and third faces 23b and 23c face each other in the direction perpendicular to the surface of the platen glass 11, and the reflected light RL that is incident from the second face 23b directs to the third face 23c. The reflected light RL passes through the third face 23c and is emitted to the outside of the light guide body 21. The light RL emitted from the third face 23c directs to the turn-back mirror 14a.

According to this embodiment, since the illumination region W3 of the original document 12 is illuminated with the illumination light in different directions from one another, irregularity of illumination of the illumination light can be suppressed.

Figure 6:
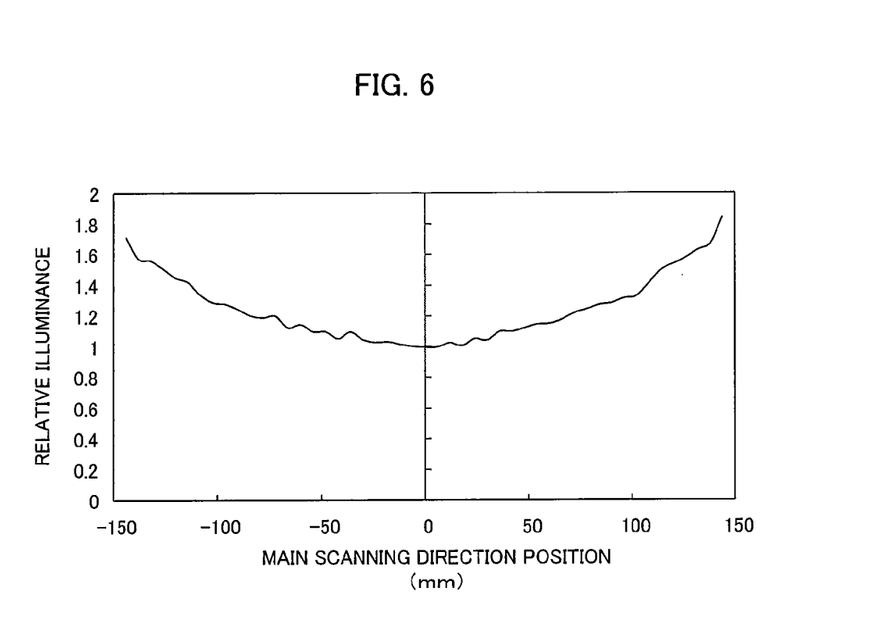
FIG. 6 is a diagram showing illuminance characteristics of the illumination apparatus in a main scanning direction.
Figure 7:
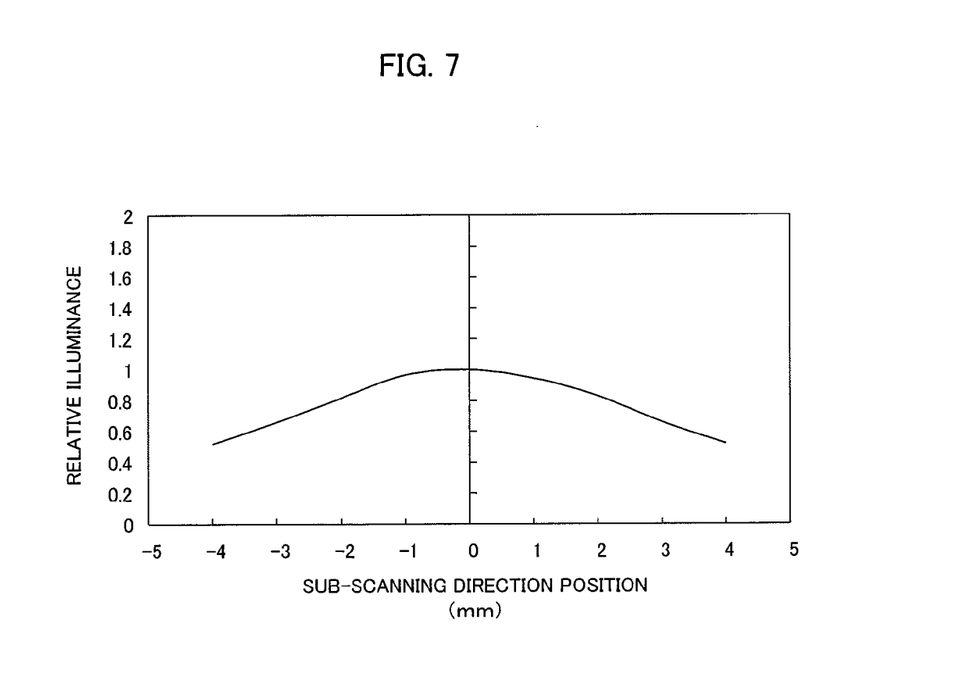
FIG. 7 is a diagram showing illuminance characteristics of the illumination apparatus in a sub-scanning direction.

FIGS. 6 and 7 show illuminance characteristics of the illumination apparatus 20. FIG. 6 shows the illuminance characteristics of the illumination apparatus 20 in the main scanning direction, and FIG. 7 shows the illuminance characteristics of the illumination apparatus 20 in the sub-scanning direction.

As shown in FIG. 6, illuminance at the center is lowest, and the illuminance is increased toward end portions. By applying the illuminance characteristics shown in FIG. 6 to the illumination apparatus 20, a reduction in the amount of ambient light caused by characteristics of the imaging lens 15 can be suppressed. That is, unevenness of the light amount of the light reaching the image sensor 16 in the main scanning direction can be suppressed.

The illuminance characteristics shown in FIG. 7 shows characteristics of the illumination light reaching the original document 12 from each of the two first faces 23a. In this embodiment, the characteristics of the illumination lights reaching the original document 12 from the two first faces 23a become the same. In this embodiment, even though the characteristics of the illumination lights reaching the original document from the two first faces 23a become the same, the characteristics of the illumination lights may be set to be different from each other. For example, a peak of the illumination light from one first face 23a and a peak of the illumination light from the other first face 23a are set to be symmetrical to each other with respect to the center of the sub-scanning direction.

By changing sizes or the like of each member of the illumination apparatus 20, the illuminance characteristics shown in FIGS. 6 and 7 may also be changed.

Second Embodiment

Figure 8:
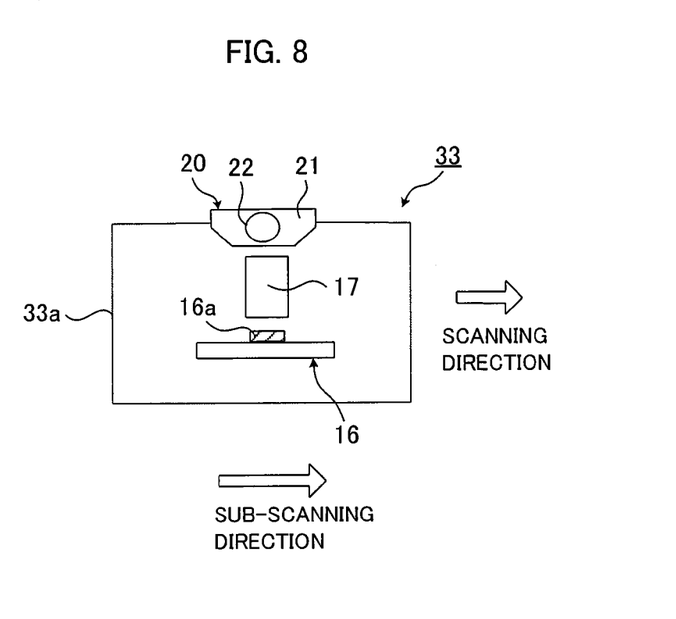
FIG. 8 is a diagram illustrating the configuration of a reading unit according to a second embodiment.

An image reading apparatus according to a second embodiment will be described. FIG. 8 shows the configuration of a reading unit 33 disposed inside the image reading apparatus.

The reading unit 33 has a case 33a, and the case 33a accommodates an imaging lens array 17 and the image sensor 16. The illumination apparatus 20 penetrates the case 33a and is fixed to the case 33a. Only light that passes through the illumination apparatus 20 is incident onto the inside of the case 33a.

In the imaging lens array 17, a plurality of lenses are lined up in the main scanning direction. The imaging lens array 17 is disposed along the image sensor 16 (the plurality of light-receiving elements 16a). The structure of the illumination apparatus 20 is the same as that according to the first embodiment.

When an image of the original document 12 is read, the reading unit 33 is moved in the sub-scanning direction.

Light illuminated from the light source 22 is incident onto the light guide body 21 and travels inside the light guide prism 23 as in the first embodiment. The light reflected from the first face 23a of the light guide prism 23 is emitted to the outside of the light guide body 21 from the second face 23b. The light emitted from the second face 23b reaches the original document 12 and the light reflected from the original document 12 is incident onto the second face 23b.

The reflected light incident onto the second face 23b passes through the light guide prism 23 and is emitted to the outside of the light guide body 21 from the third face 23c. The light emitted from the third face 23c passes through the imaging lens array 17 and reaches the light-receiving elements 16a of the image sensor 16.

According to this embodiment, an optical line path from the light source 22 to the light-receiving elements 16a can be shortened. Since the imaging lens array 17 is only disposed between the illumination apparatus 20 and the image sensor 16, so that design of an optical system from the light source 22 to the light-receiving elements 16a can be easily performed.

Third Embodiment

Figure 9:
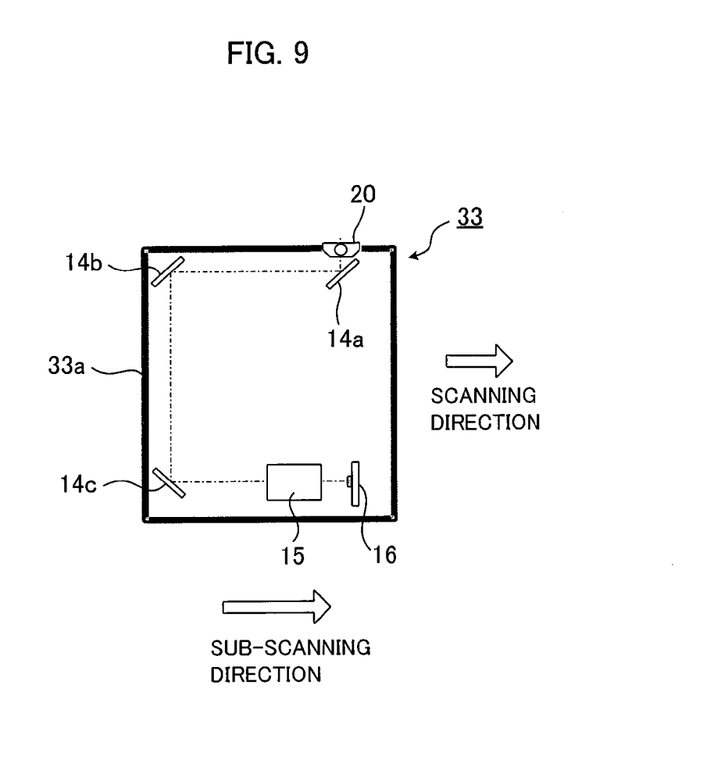
FIG. 9 is a diagram illustrating the configuration of a reading unit according to a third embodiment.

An image reading apparatus according to a third embodiment will be described. FIG. 9 shows the configuration of a reading unit disposed inside the image reading apparatus.

The reading unit 33 has the case 33a, and the case 33a accommodates the turn-back mirrors 14a, 14b, and 14c, the imaging lens 15, and the image sensor 16. The turn-back mirrors 14a, 14b, and 14c, the imaging lens 15, and the image sensor 16 are fixed to the case 33a.

The illumination apparatus 20 penetrates the case 33a, and only light that passes through the illumination apparatus 20 is incident onto the inside of the case 33a. The structure of the illumination apparatus 20 is the same as that according to the first embodiment. The inside of the case 33a is in a sealed state, and dust can be prevented from entering the case 33a.

When an image of the original document 12 is read, the reading unit 33 is moved in the sub-scanning direction indicated by an arrow. As in the first embodiment, the illumination apparatus 20 illuminates the original document with the illumination light, and the light reflected from the original document passes through the illumination apparatus 20 to reach the turn-back mirror 14a. The light that reaches the turn-back mirror 14a passes through the turn-back mirrors 14b and 14c and the imaging lens 15 so as to reach the image sensor 16.

Fourth Embodiment

Figure 10:
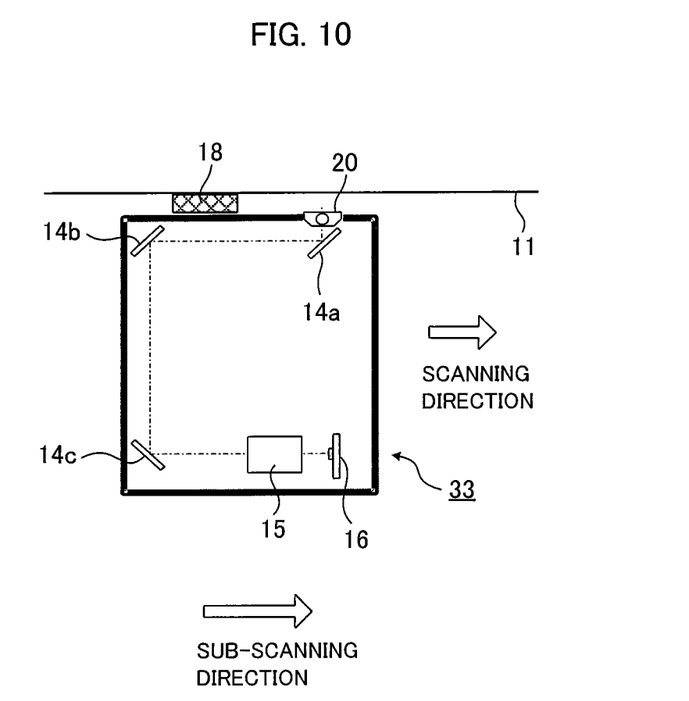
FIG. 10 is a diagram illustrating the configuration of a part of an image reading apparatus according to a fourth embodiment.

An image reading apparatus according to a fourth embodiment will be described. FIG. 10 shows the configuration of a reading unit disposed inside the image reading apparatus.

The structure of the reading unit 33 is the same as that of the reading unit 33 described according to the third embodiment. In this embodiment, a cleaner 18 is fixed to the platen glass 11. The cleaner 18 is installed at a region deviated from the region illuminated with the illumination light with respect to the original document 12. When the cleaner 18 is disposed at the position deviated from the illumination region of the illumination light, it is possible to prevent the illumination light illuminating the original document 12 from being blocked by the cleaner 18.

When an image of the original document 12 is read, the reading unit 33 is moved in the direction indicated by an arrow (the sub-scanning direction). When the reading of the image is completed, the reading unit 33 is returned to its initial position.

When the reading unit 33 is returned to its initial position, the first faces 23a of the illumination apparatus 20 come in contact with the cleaner 18. The second face 23b is moved as being in contact with the cleaner 18, thereby removing dust attached to the second face 23b.

As the cleaner 18, those that can remove dust attached to the second face 23b while being in contact with the second face 23b of the illumination apparatus 20 can be employed. Specifically, the cleaner 18 may be configured as a sponge or a brush.

In this embodiment, the reading unit 33 described according to the third embodiment is used. However, the reading unit 33 described according to the second embodiment may also be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the sprit of the inventions. The accompanying claims and their equivalents are intended to cover such forms or modifications as would fall within the scope and spirit of the inventions.

What is claimed is:

1. An image reading apparatus comprising:
an illumination apparatus including a light source that generates light for reading an image, and a light guide body extending in a predetermined direction, onto which the light from the light source is incident, and which includes a pair of first faces, a second face and a third face, the pair of first faces reflecting portions of the light to an image reading region from directions different from one another, the portions of light reflected from the first faces being transmitted through the second face and onto the image reading region and being reflected from the image reading region to be incident on the second face, the portions of light incident on the second face passing between the pair of first faces and being transmitted through the third face;
an image sensor that receives the portions of light transmitted through the third face of the light guide body and performs a photoelectric conversion on the portions of light;
an optical system that forms an image on the image sensor from the portions of light transmitted through the third face;
a case that accommodates the illumination apparatus, the image sensor, and the optical system and moves parallel to a plane of the image reading region, an inside of the case being optically sealed, the illumination apparatus penetrating through the case; and
a cleaner that comes into contact with the second face of the light guide body as the case moves parallel to the plane of the image reading region.

2. The apparatus according to claim 1, wherein the optical system includes:
a plurality of mirrors that guide the portions of the light transmitted through the third face to the image sensor; and
a lens that images the portions of the light guided by the plurality of mirrors onto the image sensor.

3. The apparatus according to claim 1, wherein the optical system is a lens array that collects the portions of the light transmitted through the third face to reach the image sensor.

4. The apparatus according to claim 1, wherein the cleaner is at a position deviated from an illumination region of the illumination apparatus during image reading.

5. The apparatus according to claim 1, wherein the first faces diffuse or reflect the light from the light source.

6. The apparatus according to claim 1, wherein the second face and the third face are parallel to the plane of the image reading region.

7. The apparatus according to claim 1, wherein the light guide body includes a prism and a case that covers a region corresponding to at least the first faces of the light guide body.

8. The apparatus according to claim 1, wherein the light guide body is a prism.

9. An image forming apparatus comprising:
an image reading apparatus including an illumination apparatus, an image sensor, an optical system, a case and a cleaner, the illumination apparatus including a light source that generates light for reading an image, and a light guide body extending in a predetermined direction, onto which the light from the light source is incident, and which has a pair of first faces, a second face and a third face, the first faces reflecting portions of the light to an image reading region from directions different from one another, the portions of light reflected from the first faces being transmitted through the second face and onto the image reading region and being reflected from the image reading region to be incident on the second face, the portions of light incident on the second face passing between the pair of first faces and being transmitted through the third face, the image sensor configured to receive the portions of the light transmitted through the third face of the light guide body and configured to perform a photoelectric conversion on the light, the optical system configured to form an image on the image sensor from the portions of the light transmitted through the third face, the case accommodating the illumination apparatus, the image sensor, and the optical system and configured to move parallel to a plane of the image reading region, an inside of the case being optically sealed, the illumination apparatus penetrating through the case, and the cleaner coming into contact with the second face of the light guide body as the case moves parallel to the plane of the image reading region; and an image forming unit that forms the image on a sheet on the basis of image data that is obtained by the image reading apparatus.

10. An image reading method comprising:

generating light with a light source of an illumination apparatus, portions of the light being incident on a light guide body of the illumination apparatus;

reflecting the portions of the light toward an image reading region from directions different from one another using a pair of first faces of the light guide body;

illuminating the image reading region with the portions of the light reflected from the first faces, the portions of the light being reflected from the image reading region to be incident on a second face of the light guide body;

passing the portions of the light incident on the second face between the pair of first faces to be emitted from a third face of the light guide body;

generating a signal corresponding to the image reading region with an image sensor with the portions of the light transmitted through the third face and passed through an optical system; and contacting a cleaner with the second face as a case moves parallel to a plane of the image reading region, the case accommodating the illumination apparatus, the image sensor, and the optical system, an inside of the case being optically sealed, the illumination apparatus penetrating through the case.

* * * * *